US011094341B1

(12) United States Patent
Matsuzawa

(10) Patent No.: US 11,094,341 B1
(45) Date of Patent: Aug. 17, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takuji Matsuzawa, Kashiwa Chiba (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/935,494

(22) Filed: Jul. 22, 2020

(30) Foreign Application Priority Data

Mar. 5, 2020 (JP) .............................. JP2020-037688

(51) Int. Cl.
*G11B 5/55* (2006.01)
*G11B 5/82* (2006.01)
*G11B 5/012* (2006.01)

(52) U.S. Cl.
CPC ............ *G11B 5/5573* (2013.01); *G11B 5/012* (2013.01); *G11B 5/82* (2013.01); *G11B 5/556* (2013.01); *G11B 5/5552* (2013.01); *G11B 5/5556* (2013.01); *G11B 5/5578* (2013.01); *G11B 5/5586* (2013.01)

(58) Field of Classification Search
None
See application file for complete search history.

(56) References Cited

U.S. PATENT DOCUMENTS

| 6,546,296 | B1 * | 4/2003 | Hara ..................... | G05B 13/024 360/69 |
| 6,693,763 | B2 | 2/2004 | Bi et al. | |
| 7,072,134 | B1 * | 7/2006 | Hirano ................. | G11B 5/5552 360/55 |
| 7,079,339 | B1 * | 7/2006 | Semba ................. | G11B 5/5552 360/31 |
| 7,085,083 | B2 * | 8/2006 | Zhu ....................... | G11B 5/455 360/31 |
| 7,768,276 | B2 * | 8/2010 | Yao ....................... | G11B 5/4826 324/727 |
| 8,611,040 | B1 | 12/2013 | Xi et al. | |
| 9,153,283 | B1 * | 10/2015 | Xi ......................... | G11B 5/5552 |
| 10,783,912 | B1 * | 9/2020 | Tu ......................... | G11B 5/59688 |

(Continued)

FOREIGN PATENT DOCUMENTS

JP 3710641 B2 10/2005

*Primary Examiner* — Tan X Dinh
(74) *Attorney, Agent, or Firm* — White & Case LLP

(57) ABSTRACT

According to one embodiment, a magnetic disk device includes a magnetic disk, a magnetic head, a first actuator that moves the magnetic head to a predetermined position on the magnetic disk, a second actuator that is provided in the first actuator and adjusts a position of the magnetic head, a control unit that controls operations of the first actuator and the second actuator, and a storing unit that stores a coefficient of an approximation polynomial calculated based on an approximation formula for approximating voltage dependency of a gain of the second actuator. When controlling the operation of the second actuator, the control unit calculates the gain amplitude of the second actuator from the approximation polynomial in which the coefficient is used and amplitude of a voltage input to the second actuator.

3 Claims, 5 Drawing Sheets

(56) References Cited

U.S. PATENT DOCUMENTS

| | | | |
|---|---|---|---|
| 2002/0036860 A1* | 3/2002 | Bi ........................ | G11B 21/106 360/77.05 |
| 2006/0109586 A1* | 5/2006 | White .................. | G11B 5/5534 360/78.05 |
| 2006/0171062 A1* | 8/2006 | Hirano ................. | G11B 5/5552 360/78.05 |
| 2007/0223136 A1* | 9/2007 | Hutsell ................. | G11B 5/556 360/78.05 |
| 2013/0188277 A1* | 7/2013 | Matsuzawa ............ | G11B 5/483 360/75 |

* cited by examiner

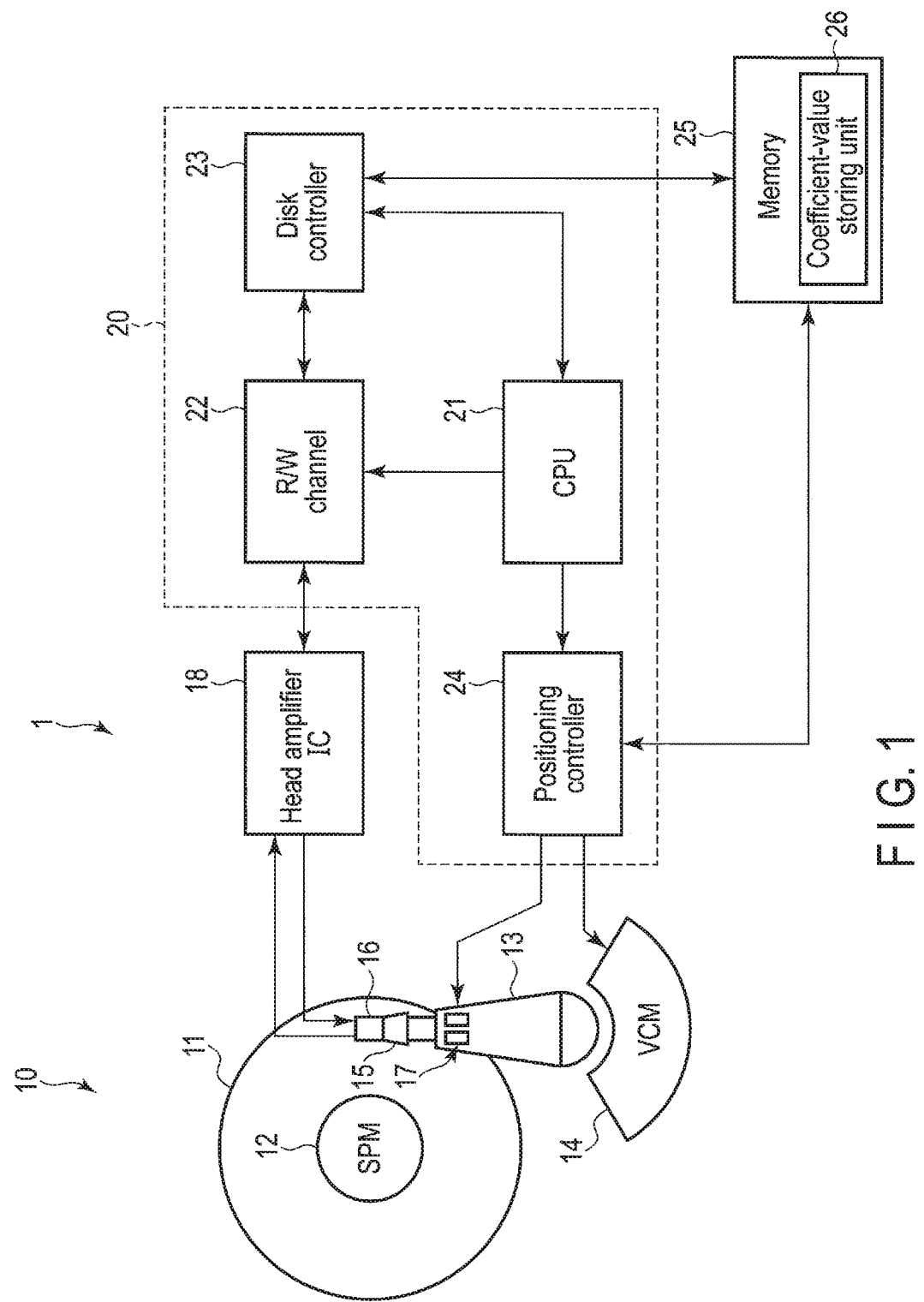
F I G. 1

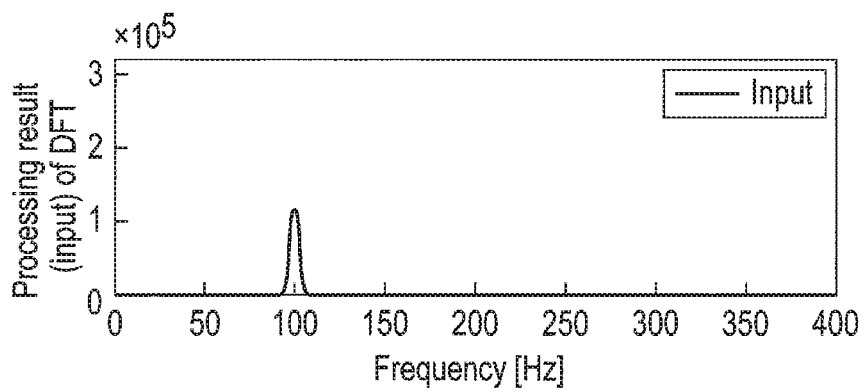
F I G. 6
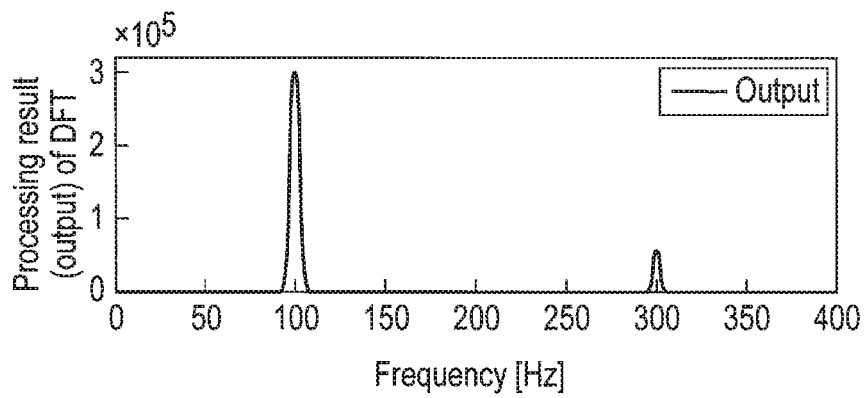
F I G. 7
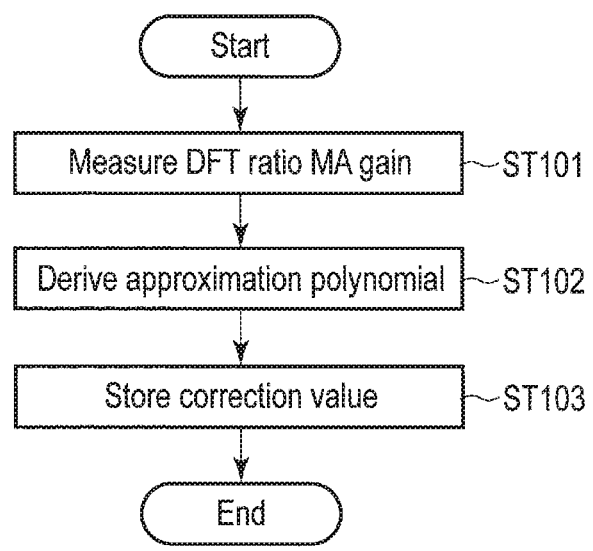
F I G. 8

MAGNETIC DISK DEVICE

CROSS-REFERENCE TO RELATED APPLICATIONS

This application is based upon and claims the benefit of priority from Japanese Patent Application No. 2020-037688, filed Mar. 5, 2020, the entire contents of which are incorporated herein by reference.

FIELD

Embodiments described herein relate generally to a magnetic disk device.

BACKGROUND

There has been known a magnetic disk device including a first actuator that locates a magnetic head on a magnetic disk and a second actuator that finely adjusts the position of the magnetic head on the magnetic disk. The second actuator is called, for example, micro actuator. Since the magnetic disk device includes the second actuator, the magnetic disk device can more accurately perform positioning of the magnetic head. It is known that a gain of input and output of the second actuator used in this type of the magnetic disk device have voltage dependency.

Therefore, in order to more accurately control the second actuator, it is requested to consider the voltage dependency of the gain of the second actuator. For example, sine waves are input to the second actuator at a plurality of voltage amplitudes. A gain at each of the voltage amplitudes is calculated from ratios of amplitudes obtained from DFT (discrete Fourier transform) to input and output waveforms of the sine waves (hereinafter, DFT ratio MA gain). The voltage dependency is polynomially approximated from the gains. However, in this polynomial approximation, distortion of an output (displacement) of the second actuator due to the voltage dependency cannot be considered. An accurate gain cannot be calculated.

A problem to be solved by the present invention is to calculate an MA gain considering distortion of an output (displacement) of the second actuator (hereinafter, amplitude ratio MA gain). An object of the present invention is to provide a magnetic disk device that can accurately control the second actuator using the amplitude ratio MA gain.

BRIEF DESCRIPTION OF THE DRAWINGS

FIG. 1 is a block diagram illustrating an example of a configuration of a magnetic disk device according to a first embodiment.

FIG. 6 is a diagram illustrating an example of a processing result (an input) of DFT according to the embodiment.

FIG. 7 is a diagram illustrating an example of a processing result (an output) of the DFT according to the embodiment.

FIG. 8 is a flowchart illustrating an example of processing for storing a coefficient value according to the embodiment.

DETAILED DESCRIPTION

Figure 2:
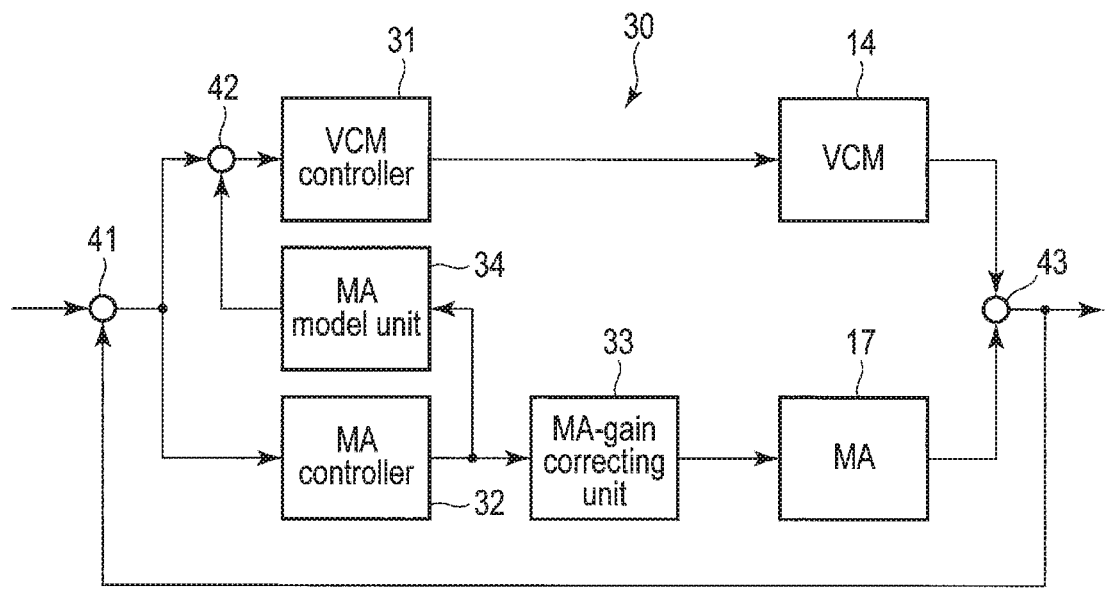
FIG. 2 is a diagram illustrating an example of a control system according to the embodiment.

In general, according to one embodiment, a magnetic disk device includes: a magnetic disk; a magnetic head that reads data from and writes data in the magnetic disk; a first actuator that moves the magnetic head to a predetermined position on the magnetic disk; a second actuator that is provided in the first actuator and adjusts a position of the magnetic head; a control unit that controls operations of the first actuator and the second actuator; and a storing unit that stores a coefficient of an approximation polynomial calculated based on an approximation formula for approximating voltage dependency of a gain of the second actuator. When controlling the operation of the second actuator, the control unit calculates the gain of the second actuator from the approximation polynomial in which the coefficient stored in the storing unit is used and amplitude of a voltage input to the second actuator.

Embodiments are explained below with reference to the drawings. Note that disclosure is only an example. The invention is not limited by content described in the following embodiments. Modifications easily conceived by those skilled in the art are naturally included in the scope of the present disclosure. To further clarify the explanation, sizes, shapes, and the like of portions are sometimes changed from those in actual implementation forms and schematically shown in the drawings. In a plurality of drawings, the same reference numbers are sometimes added to elements corresponding thereto and detailed explanation of the portions is omitted.

First Embodiment

FIG. 1 is a block diagram illustrating an example of a configuration of a magnetic disk device 1 according to a first embodiment.

The magnetic disk device 1 is configured from a head-disk assembly (HDA) 10, a head amplifier integrated circuit (hereinafter, head amplifier IC) 18, and a system on chip (SOC) 20.

The HDA 10 includes a magnetic disk 11, a spindle motor (SPM) 12, an arm 13, and a voice coil motor (VCM) 14, which is a first actuator. The magnetic disk 11 is rotated by the SPM 12. A load beam 15 is attached to the distal end of an arm 13. A magnetic head 16 is attached to the distal end of the load beam 15. The arm 13 controls to move the magnetic head 16 to a designated position on the magnetic disk 11 with driving of the VCM 14.

Further, a pair of piezoelectric elements (for example, Pb(Zr,Ti)O3) 17 is disposed near an attachment part of the load beam 15 at the distal end portion of the arm 13. When a voltage is applied to the pair of piezoelectric elements 17, the piezoelectric elements on the left and the right expand and contract respectively in opposite phases. By displacing the magnetic head 16 at the distal end of the load beam 15 in a radial direction (a cross track direction) on the magnetic disk 11, the position of the magnetic head 16 is finely adjusted in the radial direction of the magnetic disk 11 on the magnetic disk 11. A two-stage actuator in which the piezoelectric element-driven load beam 15 is added to the distal end of the arm 13 driven by the VCM in this way is realized. In the following explanation, the piezoelectric elements 17 are referred to as micro actuator (a second actuator; hereinafter simply referred to as "MA" as well) 17. Note that, in the following explanation in this embodiment, the micro actuator 17 is provided near the attachment part of the load beam 15. However, not only this, but the micro actuator 17 may be provided in the magnetic head 16.

The magnetic head 16 has structure in which a read head element and a write head element are separated and mounted on one slider. The read head element reads out data recorded in the magnetic disk 11. The write head element writes data in the magnetic disk 11.

The head amplifier IC 18 includes a read amplifier and a write driver. The read amplifier amplifies a read signal read by the read head element and transmits the read signal to a read/write (R/W) channel 22. On the other hand, the write driver transmits, to the write head element, a write current corresponding to write data output from the R/W channel 22.

The SOC 20 includes a CPU (microprocessor) 21, the R/W channel 22, a disk controller 23, and a positioning controller 24. The CPU 21 is a main controller for drive and executes servo control for performing positioning of the magnetic head 16 via the positioning controller 24 and executes read/write control for data via the head amplifier IC 18.

The R/W channel 22 includes a read channel for executing signal processing for read data and a write channel for executing signal processing for write data. The disk controller 23 executes interface control for controlling data transfer between a host system (not illustrated) and the R/W channel 22. Note that the positioning controller 24 may be realized as hardware or may be realized as software (firmware).

A memory 25 includes a volatile memory and a nonvolatile memory. For example, the memory 25 includes a buffer memory formed by a DRAM and a flash memory. In the nonvolatile memory of the memory 25, in addition to a region (not illustrated) for storing programs and the like necessary for processing of the CPU 21, a region 26 for storing a coefficient value (hereinafter referred to as "coefficient-value storing unit") is provided. The coefficient-value storing unit 26 stores a coefficient value of a function for calculating an amplitude ratio of the micro actuator 17. Specific content of the coefficient value is explained below. Note that, since the micro actuator 17 is provided for each of magnetic heads 16, coefficient values corresponding to the number of the magnetic heads 16 are stored in association with the magnetic heads 16. In the following explanation in this embodiment, the coefficient-value storing unit 26 is provided in the memory 25. However, the coefficient-value storing unit 26 may be provided in the SOC 20.

As illustrated in FIG. 1, in the magnetic disk device 1 mounted with the micro actuator 17, in order to perform positioning control for the magnetic head 16 with the positioning controller 24, it is necessary to grasp, for each of the magnetic heads 16, a gain (hereinafter referred to as "MA gain"), which is an input output ratio of the micro actuator 17. This is because the CPU 21 can accurately position the magnetic head 16 in a desired position on the magnetic disk 11 by operating the micro actuator 17 considering this MA gain.

A control system that operates the voice coil motor 14 and the micro actuator 17 is explained. FIG. 2 is a diagram illustrating an example of a control system 30 that operates the voice coil motor 14 and the micro actuator 17. Note that, in this embodiment, it is assumed that a VCM controller 31, an MA controller 32, an MA-gain correcting unit 33, and an MA model unit 34 illustrated in FIG. 2 are provided in the positioning controller 24.

In FIG. 2, a target signal is input to an adder 41. After a signal from an adder 43 explained below is added to the target signal in the adder 41, an output of the adder 41 is input to an adder 42 and the MA controller 32. The signal output from the MA controller 32 is input to the MA-gain correcting unit 33 and the MA model unit 34. The MA model unit 34 is a control unit that reflects the operation of the micro actuator on the operation of the voice coil motor 14. The signal passing through the MA model unit 34 is input to the adder 42. Consequently, after a signal on which the processing of the MA model unit 34 is reflected is added to the signal from the adder 41 by the adder 42, the signal from the adder 41 is input to the VCM controller 31. The VCM controller 31 operates the voice coil motor 14. In this way, the signal after operating the voice coil motor 14 is input to the adder 43.

On the other hand, the MA-gain correcting unit 33 performs calculation of an MA gain for the signal input from the MA controller 32 such that the micro actuator 17 is accurately positioned in a target position. The signal on which the calculation of the MA gain is reflected in this way is input to the micro actuator 17. Consequently, the micro actuator 17 is accurately positioned in the target position. The signal input to the micro actuator 17 is output to the adder 43. The adder 43 adds up the signals from the voice coil motor 14 and the micro actuator 17 and inputs an added-up signal of the signals to the adder 41. The operations of the voice coil motor 14 and the micro actuator 17 are controlled by the control system 30 explained above.

In general, in the magnetic disk device including the micro actuator 17, a sensor for measuring displacement of the micro actuator 17 is not provided. This is because manufacturing cost increases. Accordingly, it is conceivable to perform processing explained below. An MA gain is estimated from a transfer function from an input to a position in a state in which the micro actuator 17 is positioned with being operated and a sensitivity function in the state in which the micro actuator 17 is positioned without being operated. The CPU 21 controls the MA-gain correcting unit 33 based on the estimated MA gain and operates the micro actuator 17. By performing such processing, the micro actuator 17 is accurately operated.

The MA gain has voltage dependency as explained above. Therefore, the voltage dependency is explained with reference to FIGS. 3 and 4.

Figure 3:
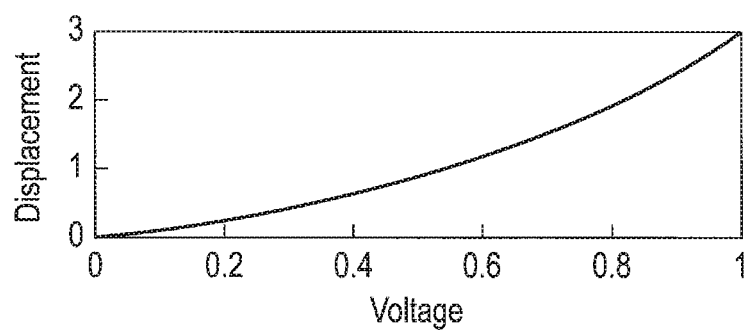
FIG. 3 is a diagram illustrating an example of an input output relation of the second actuator according to the embodiment.
Figure 4:
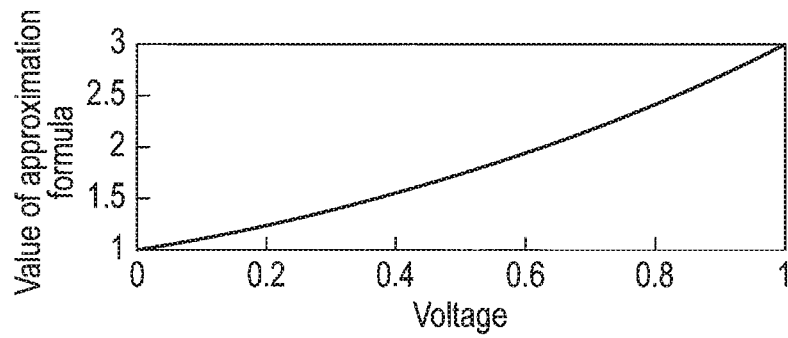
FIG. 4 is a diagram illustrating an example of voltage dependency of the second actuator according to the embodiment.

FIG. 3 is a diagram illustrating an example of an input output relation of the micro actuator 17. In FIG. 3, the vertical axis represents displacement and the horizontal axis represents a voltage. A relation in which the displacement increases as the voltage increases is illustrated. FIG. 4 is a diagram illustrating an example of voltage dependency of the micro actuator 17. In FIG. 4, the vertical axis represents a value of an approximate value and the horizontal axis represents a voltage. A relation in which deviation of the approximate value increases as the voltage increases is illustrated. When FIG. 3 and FIG. 4 are compared, it can be understood that there is a correlation between the input output relation of the MA gain and the voltage dependency and there is voltage dependency in which the deviation of the approximate value increases as displacement of input and output increases.

Figure 5:
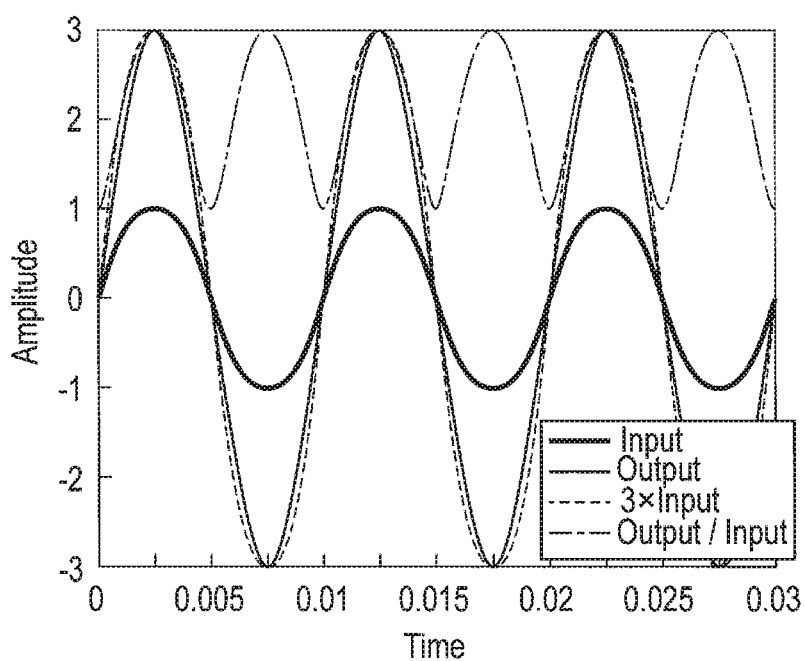
FIG. 5 is a diagram illustrating an example of an input output relation of a sine wave according to the embodiment.

However, in the case in which there is such voltage dependency, when a voltage of a sine wave is input to the micro actuator 17, an output waveform of the voltage is not the sine wave. FIG. 5 is a diagram illustrating an example of an input output relation at the time when the voltage of the sine wave is input in the case in which there is the voltage dependency illustrated in FIG. 3. In FIG. 5, the vertical axis represents amplitude and the horizontal axis represents time. An input waveform (Input), an output waveform (Output), a 3×input waveform (Input), and an input output waveform (Output/Input) are illustrated. Note that, in FIG. 5, an input output ratio is 3. When the output waveform (Output) and the 3×input waveform (Input) are compared, it is indicated that the output waveform (Output) and the 3×input waveform (Input) do not coincide and the output waveform is distorted and is not a sine wave.

Since the distortion occurs in the output waveform in this way, an error occurs when a DFT ratio MA gain using DFT is calculated. In FIG. 5 referred to above, the input output ratio is "3" but the input output ratio is not 1:3 because of the influence of the distortion. This is explained more in detail with reference to FIGS. 6 and 7. FIG. 6 is a diagram illustrating an example of a processing result (an input) of the DFT. FIG. 7 is a diagram illustrating an example of a processing result (an output) of the DFT. In FIGS. 6 and 7, the horizontal axis represents a frequency. When FIG. 6 and FIG. 7 are compared, whereas the input near 100 Hz exceeds 1 (see FIG. 6), the output is lower than 3 (see FIG. 7). That is, the input output ratio is not 3. The DFT ratio MA gain not being 3 in this way is considered to be because the influence of distortion appears near 300 Hz in FIG. 7 and the output is dispersed near 300 Hz.

Processing for measuring DFT ratio MA gains of a plurality of voltage values explained above, polynomially approximating voltage dependency from a result of the measurement, and calculating a DFT ratio MA gain is explained.

For example, when approximation is performed by a quadratic polynomial indicated by the following Expression (1), $$f(x) = a_0 + a_1 x + a_2 x^2 \tag{1}$$

$G_D(X_1)$, $G_D(X_2)$, and $G_D(X_3)$, which are DFT ratio MA gains, are measured in three voltage amplitudes $X_1$, $X_2$, and $X_3$ and calculation is performed as indicated by the following Expressions (2) and (3).

$$\begin{cases} a_0 = G_D(x_1) + x_1 x_2 \beta \gamma - \alpha x_1 \\ a_1 = \alpha - (x_1 + x_2) \beta \gamma \\ a_2 = \beta \gamma \end{cases} \tag{2}$$

$$\alpha := \frac{G_D(x_2) - G_D(x_1)}{x_2 - x_1}, \tag{3}$$
$$\beta := \frac{G_D(x_3) - G_D(x_1)}{x_3 - x_1} - \alpha,$$
$$\gamma := \frac{1}{x_3 - x_2},$$

In polynomial approximation for calculating coefficients of the quadratic polynomial, an error based on the distortion explained with reference to FIGS. 3 to 7 occurs. Therefore, the CPU 21 cannot perform accurate control for the micro actuator 17. That is, it is likely that the micro actuator 17 operates larger or smaller than instructed by the CPU 21 because of the error. The magnetic head 16 cannot be accurately positioned in a desired position on the magnetic disk 11 by influence due to the error.

Therefore, in this embodiment, the coefficients of the quadratic polynomial are theoretically calculated by executing the following calculation without using Expressions (2) and (3) described above.

First, voltage dependency of the amplitude ratio MA gain is approximated by the following Expression (4).

$$f(x) = \sum_{k=0}^{n} a_K x^k \tag{4}$$

When an input to the micro actuator 17 during DFT ratio MA gain measurement is represented as $u = u_0 \sin\theta$, displacement y of MA at this time is as indicated by the following Expression (5).

$$y = f(|u|)u = u_0 \sum_{k=0}^{n} a_k (u_0 |\sin\theta|)^k \sin\theta \tag{5}$$

An odd power of $\sin\theta$ can be represented by a sum of odd number times angles of $\sin\theta$ (a sine wave fundamental frequency) as indicated by the following Expression (6).

$$\sin^{2m+1}\theta = \sum_{k=0}^{n} g_{(m,k)} \sin(2k+1)\theta \tag{6}$$

A coefficient $g(m,k)$ can be strictly calculated without using approximation.

From Expression (6) and the following Expression (7), $$|\sin\theta| = \frac{2}{\pi} - \frac{4}{\pi} \sum_{m=1}^{\infty} \frac{1}{4m^2 - 1} \cos 2m\theta \tag{7}$$

the displacement y of the micro actuator 17 is as indicated by the following Expression (8). Only the odd number times angle of $\sin\theta$ appears.

$$y = \sum_{k=0}^{\lfloor \frac{n}{2} \rfloor} \sum_{l=0}^{k} a_{2k} u_0^{2k+1} g_{(k,l)} \sin(2l+1)\theta + \tag{8}$$

$$\sum_{k=0}^{\lfloor \frac{n-1}{2} \rfloor} \sum_{l=0}^{k} \frac{2 a_{2k+1} u_0^{2(k+1)}}{\pi} g_{(k,l)} \sin(2l+1)\theta -$$

$$\frac{2}{\pi} \sum_{k=0}^{\lfloor \frac{n-1}{2} \rfloor} \sum_{m=1}^{\infty} \sum_{l=0}^{k} \frac{a_{2k+1} g_{(k,l)} u_0^{2(k+1)}}{4m^2 - 1}$$

$$\{\sin[2(m+l) + 1]\theta - \sin[2(m-l) - 1]\theta\}$$

A gain obtained by dividing, by the coefficient of sine, a value obtained by adding up together all coefficients of an odd number times angle $\sin(2k+1)\theta$ (k: natural number) when k is an even number or subtracting all the coefficients from one another when k is an odd number is an amplitude ratio MA gain desired to be calculated. A coefficient $\alpha_k$ of the approximation polynomial can be calculated from DFT ratio MA gains measured at different input voltage amplitudes at n+1 points.

When measured voltages of the DFT ratio MA gains at the n+1 points are represented as $x_p$, p=1, ..., n+1, sin θ of the MA displacement y is represented by the following Expression (9). Therefore, all coefficients $\alpha_0$, ..., $\alpha_n$ of the approximation polynomial can be calculated from Expression (9).

$$\sum_{k=0}^{\lfloor \frac{n}{2} \rfloor} a_{2k} x_p^{2k+1} g_{(k,0)} + \sum_{k=0}^{\lfloor \frac{n-1}{2} \rfloor} \frac{2 a_{2k+1} x_p^{2(k+1)}}{\pi} g_{(k,0)} - \frac{8}{\pi} \sum_{k=0}^{\lfloor \frac{n-1}{2} \rfloor} \sum_{l=0}^{k} \frac{a_{2k+1} g_{(k,l)} x_p^{2(k+1)} (2l+1)}{(4l-1)[4(l+1)^2 - 1]} \quad (9)$$

All the coefficients of the approximation polynomial calculated as explained above are stored as coefficient values in the coefficient-value storing unit 26 of the memory 25 in association with the magnetic heads 16. Note that the amplitude ratio MA gain may be calculated every time a voltage value applied to the micro actuator 17 changes or, since the approximation polynomial is calculated, the amplitude ratio MA gain may be calculated from the approximation polynomial.

Approximation of voltage dependency of an MA gain by the quadratic polynomial of Expression (1) described above is explained.

Displacement of MA at this time can be represented by the following Expression (10) obtained by setting n=2 in Expression (8).

$$y = f(|u|)u\left(a_0 + \frac{2a_1 u_0}{\pi} + \frac{3a_2 u_0^2}{4}\right)u_0 \sin\theta - \frac{a_2 u_0^3}{4}\sin 3\theta - \frac{2a_1 u_0^2}{\pi}\sum_{m=1}^{\infty}\frac{1}{4m^2 - 1}[\sin(2m+1)\theta - \sin(2m+1)\theta] \quad (10)$$

A third term of the right side is sufficiently small if a value of m is large.

The coefficients $\alpha_0$, $\alpha_1$, and $\alpha_2$ of the quadratic polynomial can be calculated from DFT ratio MA gains measured at input amplitudes at three or more points. It is assumed that $G_D(X_1)$, $G_D(X_2)$, and $G_D(X_3)$, which are DFT ratio MA gains, are measured at three points $X_1$, $X_2$, and $X_3$.

$G_D(X_1)$, $G_D(X_2)$, and $G_D(X_3)$ can be represented by the following Expression (11).

$$\begin{cases} G_D(x_1) = a_0 + \frac{2a_1 x_1}{\pi} + \frac{3a_2 x_1^2}{4} + \frac{2a_1 x_1^2}{3\pi} \\ G_D(x_2) = a_0 + \frac{2a_1 x_2}{\pi} + \frac{3a_2 x_2^2}{4} + \frac{2a_1 x_2^2}{3\pi} \\ G_D(x_3) = a_0 + \frac{2a_1 x_3}{\pi} + \frac{3a_2 x_3^2}{4} + \frac{2a_1 x_3^2}{3\pi} \end{cases} \quad (11)$$

Expression (12) can be transformed into the following Expression (13). Therefore, by solving an equation of Expression (12), the coefficients $\alpha_0$, $\alpha_1$, and $\alpha_2$ of the quadratic polynomial can be calculated.

$$\begin{bmatrix} G_D(x_1) \\ G_D(x_2) \\ G_D(x_3) \end{bmatrix} = \begin{bmatrix} 1 & \frac{2(3+x_1)x_1}{3\pi} & \frac{3x_1^2}{4} \\ 1 & \frac{2(3+x_2)x_2}{3\pi} & \frac{3x_2^2}{4} \\ 1 & \frac{2(3+x_3)x_3}{3\pi} & \frac{3x_3^2}{4} \end{bmatrix} \begin{bmatrix} a_0 \\ a_1 \\ a_2 \end{bmatrix} \quad (12)$$

When a quadratic polynomial f(x) can be calculated in this way, amplitude ratio MA gain with respect to any input can be calculated from f(x).

Processing for storing a coefficient value of an MA gain in the coefficient-value storing unit 26 is explained. FIG. 8 is a flowchart illustrating an example of processing for storing a coefficient value executed by the CPU 21. The coefficient value is a coefficient of a quadratic polynomial. When a plurality of magnetic heads 16 are present, coefficient values are stored in association with the magnetic heads 16.

As illustrated in FIG. 8, the CPU 21 measures a DFT ratio MA gain (ST101). In this embodiment, in order to calculate the coefficient of the quadratic polynomial, DFT ratio MA gains are measured in positions at three or more points. When a coefficient of a polynomial of degree n is calculated, DFT ratio MA gains are measured in positions at n+1 or more points.

Subsequently, the CPU 21 derives the quadratic polynomial from Expression (1) and Expression (10) using Expression (12) (ST102). That is, the CPU 21 calculates the coefficient of the quadratic polynomial. The CPU 21 stores a coefficient value in the coefficient-value storing unit 26 (ST103). More specifically, the CPU 21 stores the coefficient calculated in step ST102 in the coefficient-value storing unit 26 as the coefficient value, for example, in association with a head number of the magnetic head 16.

Figure 9:
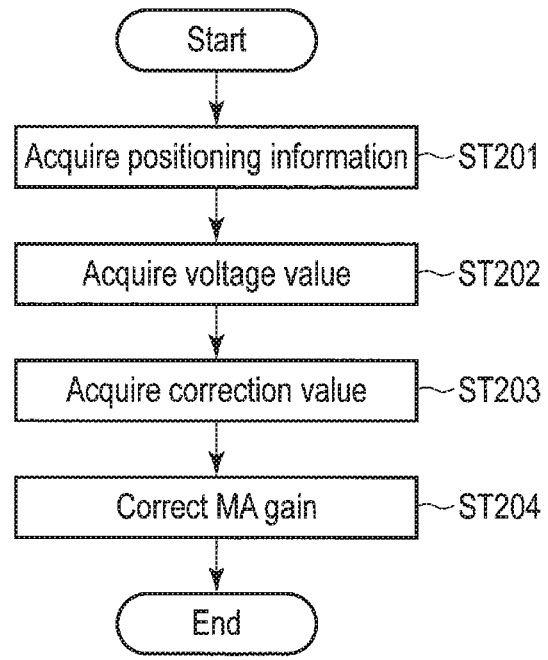
FIG. 9 is a flowchart illustrating an example of calculation processing for an MA gain according to the embodiment.

Processing for calculating an MA gain is explained. FIG. 9 is a flowchart illustrating an example of the processing for calculating an MA gain executed by the CPU 21. This processing is executed when the magnetic head 16 is adjusted to a desired position on the magnetic disk 11 by the micro actuator 17.

The CPU 21 acquires positioning information (ST201) and acquires a voltage value for operating the micro actuator 17 (ST202). The positioning information is information indicating a position where data is read from and written in the magnetic disk 11. The CPU 21 acquires, based on the position information, a voltage value for moving the arm 13 with the voice coil motor 14 for moving the magnetic head 16 from a present position to the position indicated by the position information and a voltage value for operating the micro actuator 17. Note that, in FIG. 9, description about processing for moving the arm 13 is omitted.

Subsequently, the CPU 21 acquires a coefficient value corresponding to the magnetic head 16 from the coefficient-value storing unit 26 (ST203). In this embodiment, a coefficient of a quadratic polynomial is acquired. The CPU 21 calculates an MA gain of the micro actuator 17 from the quadratic polynomial acquired in this way and the amplitude of a voltage input to the micro actuator 17 (ST204). Consequently, the CPU 21 can calculate, every time the micro actuator 17 is operated and every time the voltage for operating the micro actuator 17 is changed based on the positioning information, the MA gain of the micro actuator 17 considering distortion depending on the voltage dependency. Accordingly, the magnetic disk device 1 can accurately control the micro actuator 17.

Second Embodiment

A case in which there is a hysteresis characteristic in an amplitude ratio MA gain is explained.

Figure 10:
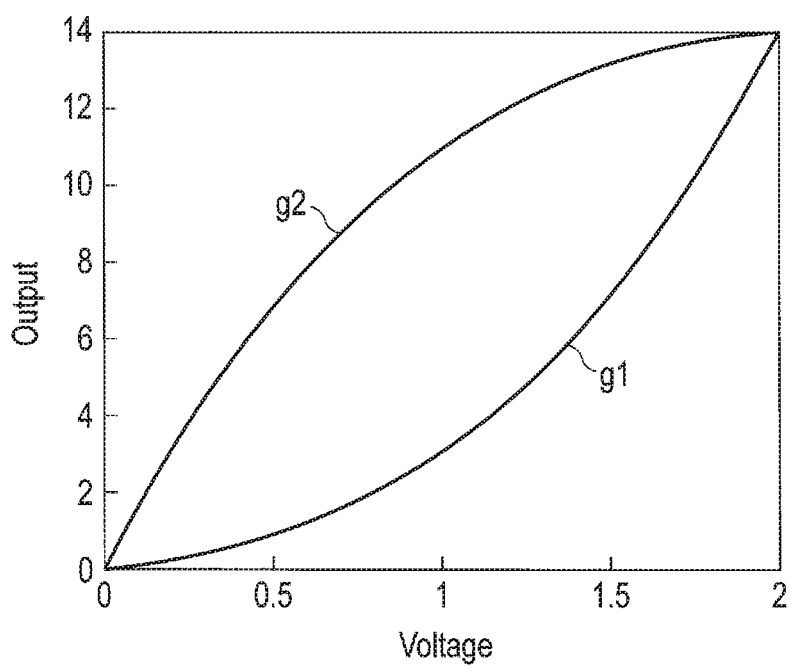
FIG. 10 is a diagram illustrating an example of a hysteresis characteristic according to a second embodiment.

FIG. 10 is a diagram showing an example of a case in which there is a hysteresis characteristic in an input output relation of an MA gain. In FIG. 10, the vertical axis represents an output and the horizontal axis represents a voltage. A graph g1 shows an output at the time when the voltage rises and graph g2 shows an output at the time when the voltage drops.

When there is such a hysteresis characteristic, x of the input output relation f(x) indicated by Expression (1) described above may be doubled. A calculation formula is calculated by translating a lower left point of f(x) obtained by doubling x in this way to the origin. A hysteresis may be calculated using the calculated calculation formula. Note that, f(x) may be calculated by halving an input voltage without doubling x.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk;
    a magnetic head that reads data from and writes data in the magnetic disk;
    a first actuator that moves the magnetic head to a predetermined position on the magnetic disk;
    a second actuator that is provided in the first actuator and adjusts a position of the magnetic head;
    a control unit that controls operations of the first actuator and the second actuator; and
    a storing unit that stores a first coefficient of an approximation polynomial calculated based on an approximation formula for approximating voltage dependency of a first gain of the second actuator, wherein
    when controlling the operation of the second actuator, the control unit calculates the first gain of the second actuator from the approximation polynomial in which the first coefficient stored in the storing unit is used, a second coefficient of an odd number times angle of a sine wave when an output of the second actuator calculated from an input sine wave voltage is represented as a sum of odd numbers times angle of a fundamental frequency of the sine wave, and a desired displacement of the second actuator.

2. The magnetic disk device according to claim 1, wherein
    the control unit represents the output of the second actuator as a sum of odd numbers times angle of a fundamental frequency of the sine wave voltage, and
    when the odd numbers are represented as 2k+1, where k is 0, 1, 2 . . . ,
    calculates the first gain by adding up all the second coefficients of the odd numbers times angle when k is an even number or subtracting all the second coefficients when k is an odd number.

3. The magnetic disk device according to claim 1, wherein the first coefficient is calculated from a plurality of second gains by measuring the first gain of the second actuator by the discrete Fourier transform at a number of measurement points greater than a degree of the approximation polynomial and the second coefficient of a sine wave fundamental frequency of the output of the second actuator as a sum of odd numbers times angle of a fundamental frequency of the sine wave voltage.

* * * * *